United States Patent
Li et al.

(10) Patent No.: US 12,043,269 B2
(45) Date of Patent: Jul. 23, 2024

(54) METHODS AND SYSTEMS FOR CAMERA TO GROUND ALIGNMENT

(71) Applicant: GM GLOBAL TECHNOLOGY OPERATIONS LLC, Detroit, MI (US)

(72) Inventors: Binbin Li, College Station, TX (US); Xinyu Du, Oakland Township, MI (US); Yao Hu, Sterling Heights, MI (US); Hao Yu, Troy, MI (US); Wende Zhang, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 320 days.

(21) Appl. No.: 17/651,406

(22) Filed: Feb. 16, 2022

(65) Prior Publication Data

US 2023/0256975 A1    Aug. 17, 2023

(51) Int. Cl.
*G06V 20/58* (2022.01)
*B60W 40/10* (2012.01)

(52) U.S. Cl.
CPC ............. *B60W 40/10* (2013.01); *G06V 20/58* (2022.01); *B60W 2420/403* (2013.01); *B60W 2552/53* (2020.02)

(58) Field of Classification Search
None
See application file for complete search history.

(56) References Cited

U.S. PATENT DOCUMENTS

| | | |
|---|---|---|
| 8,073,196 B2 | 12/2011 | Yuan et al. |
| 8,154,594 B2 | 4/2012 | Seki et al. |
| 8,320,616 B2 | 11/2012 | Kaiser et al. |
| 10,379,545 B2 | 8/2019 | Kennedy et al. |
| 11,037,051 B2 | 6/2021 | Kim et al. |
| 11,608,078 B2 | 3/2023 | He et al. |
| 11,652,965 B2 | 5/2023 | Meier et al. |
| 11,734,580 B2 | 8/2023 | Jain et al. |
| 11,816,991 B2 | 11/2023 | Stein et al. |
| 11,827,203 B2 | 11/2023 | Chakravarty et al. |
| 2013/0027511 A1 | 1/2013 | Takemura et al. |
| 2018/0329066 A1 | 11/2018 | Pacala |
| 2019/0104278 A1 | 4/2019 | Ermilios et al. |
| 2019/0271549 A1* | 9/2019 | Zhang ............... G06T 7/70 |

(Continued)

FOREIGN PATENT DOCUMENTS

CN    113785302 A    12/2021

*Primary Examiner* — James M McPherson
(74) *Attorney, Agent, or Firm* — Lorenz & Kopf LLP

(57) ABSTRACT

Systems and methods for a vehicle are provided. In one embodiment, a method includes: receiving image data defining a plurality of images associated with an environment of the vehicle; receiving vehicle data indicating a velocity of the vehicle, wherein the vehicle data is associated with the image data; determining, by a processor, feature points within at least one image based on the vehicle data and a three dimensional projection method; selecting, by the processor, a subset of the feature points as ground points; determining, by the processor, a ground plane based on the subset of feature points; determining, by the processor, a ground normal vector from the ground plane; determining, by the processor, a camera to ground alignment value based on the ground normal vector; and generating, by the processor, second image data based on the camera to ground alignment value.

20 Claims, 9 Drawing Sheets

(56) References Cited

U.S. PATENT DOCUMENTS

| | | |
|---|---|---|
| 2019/0325595 A1* | 10/2019 | Stein .................... G06V 10/764 |
| 2021/0192234 A1* | 6/2021 | Chen .................... B60W 60/001 |
| 2022/0036097 A1 | 2/2022 | Ogino et al. |
| 2022/0128702 A1* | 4/2022 | Ziglar ............... G06F 18/24147 |
| 2022/0187843 A1* | 6/2022 | Wang ...................... G01S 5/163 |
| 2022/0405506 A1 | 12/2022 | Taamazyan et al. |
| 2023/0230392 A1 | 7/2023 | Tian et al. |
| 2023/0256975 A1 | 8/2023 | Li et al. |
| 2023/0260157 A1 | 8/2023 | Li et al. |
| 2024/0077879 A1 | 3/2024 | Zhang et al. |

* cited by examiner

METHODS AND SYSTEMS FOR CAMERA TO GROUND ALIGNMENT

TECHNICAL FIELD

The technical field generally relates to surround view images of a vehicle, and more particularly to generating a virtual view from camera images, the virtual view being based on improved camera to ground alignment.

Modern vehicles are typically equipped with one or more optical cameras that are configured to provide image data to an occupant of the vehicle. The image data may show a virtual scene of the vehicle's surroundings. The virtual scene may be generated based on multiple images that are captured from different perspectives. For example, the images are taken from different image sources that are located at different positions about the vehicle or from a single source that rotates with respect to the vehicle. The images are merged into a single perspective, such as a birds-eye-view perspective, based on camera to ground alignment information. Methods to determine camera to ground alignment information can be computationally intensive, especially if performed in real-time.

Accordingly, it is desirable to provide improved systems and methods for determining camera to ground alignment. Furthermore, other desirable features and characteristics of the present invention will become apparent from the subsequent detailed description and the appended claims, taken in conjunction with the accompanying drawings and the foregoing technical field and background.

SUMMARY

A methods and systems are provided for a vehicle. In one embodiment, a method includes: receiving image data defining a plurality of images associated with an environment of the vehicle; receiving vehicle data indicating a velocity of the vehicle, wherein the vehicle data is associated with the image data; determining, by a processor, feature points within at least one image based on the vehicle data and a three dimensional projection method; selecting, by the processor, a subset of the feature points as ground points; determining, by the processor, a ground plane based on the subset of feature points; determining, by the processor, a ground normal vector from the ground plane; determining, by the processor, a camera to ground alignment value based on the ground normal vector; and generating, by the processor, second image data based on the camera to ground alignment value.

In various embodiments, the three dimensional projection method determines the feature point from a two dimensional image sequence from the plurality of images using back-projection of the feature point from the two dimensional image to a unit plane.

In various embodiment, the three dimensional projection method further determines the feature point from the two dimensional image sequence by determining featuring shifting in the unit plane based on the vehicle data, and predicting a three dimensional point of the feature point based on the feature shifting.

In various embodiments, the three dimensional projection method further determines the feature point by projecting the three dimensional feature point back to the two dimensional image based on the feature shifting.

In various embodiments, the selecting the subset of feature points is based on a fixed two dimensional image road mask and a three dimensional region.

In various embodiments, the selecting the subset of feature points is based on a dynamic two dimensional image road mask.

In various embodiments, the selecting the subset of feature points is based on homography constraints.

In various embodiments, the method includes: receiving lighting data indicating lighting conditions associated with the environment of the vehicle; selecting at least one region of interest within the at least one image based on the lighting data. The determining the features points is based on the at least one region of interest.

In various embodiments, the lighting data includes at least one of environmental lighting data, climate data, and time of day data.

In various embodiments, the method includes: evaluating vehicle conditions to determine when the vehicle driving smooth and straight. In response to the determination that the vehicle is driving smooth and straight, the determining the feature points is performed.

In various embodiments, the vehicle conditions include vehicle acceleration, vehicle velocity, and steering wheel angle.

In various embodiments, the vehicle conditions include a determined distance travelled between two images of the plurality of images.

In various embodiments, the method includes: determining a camera pose to be unreliable based on a reference camera rotation and a translation; filtering feature points for images with a camera pose determined to be unreliable. The determining the subset of feature points is based on the filtered feature points.

In various embodiments, the method includes optimizing the ground normal vector based on a sliding window method associated with the plurality of images.

In various embodiments, the optimizing the ground normal vector is further based on a minimization of a computed transfer distance based on homography.

In various embodiments, the determining the ground plane is based on constraints associated with a reference ground normal vector and a motion direction.

In another embodiments, a system includes: a data storage element comprising computer readable instructions; and a processor configured to execute the computer readable instructions, the computer readable instructions controlling the processor to perform operations. The operations include: receiving image data defining a plurality of images associated with an environment of the vehicle; receiving vehicle data indicating a velocity of the vehicle, wherein the vehicle data is associated with the image data; determining feature points within at least one image based on the vehicle data and a three-dimensional projection method; selecting a subset of the feature points as ground points; determining a ground plane based on the subset of feature points; determining a ground normal vector from the ground plane; determining a camera to ground alignment value based on the ground normal vector; and generating second image data based on the camera to ground alignment value.

In various embodiments, the three dimensional projection method determines the feature point from a two dimensional image sequence from the plurality of images using back-projection of the feature point from the two dimensional image to a unit plane.

In various embodiments, the three dimensional projection method further determines the feature point from the two dimensional image sequence by determining featuring shifting in the unit plane based on the vehicle data, predicting a three dimensional point of the feature point based on the feature shifting, and projecting the three dimensional feature point back to the two dimensional image based on the feature shifting.

In another embodiment, a vehicle includes: a camera configured to capture images of an environment of the vehicle; and a controller having a processor configured to receive the images, receive vehicle data indicating a velocity of the vehicle, wherein the vehicle data is associated with the images, determine feature points within at least one image based on the vehicle data and a three-dimensional projection method, select a subset of the feature points as ground points, determine a ground plane based on the subset of feature points, determine a ground normal vector from the ground plane, determine a camera to ground alignment value based on the ground normal vector.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
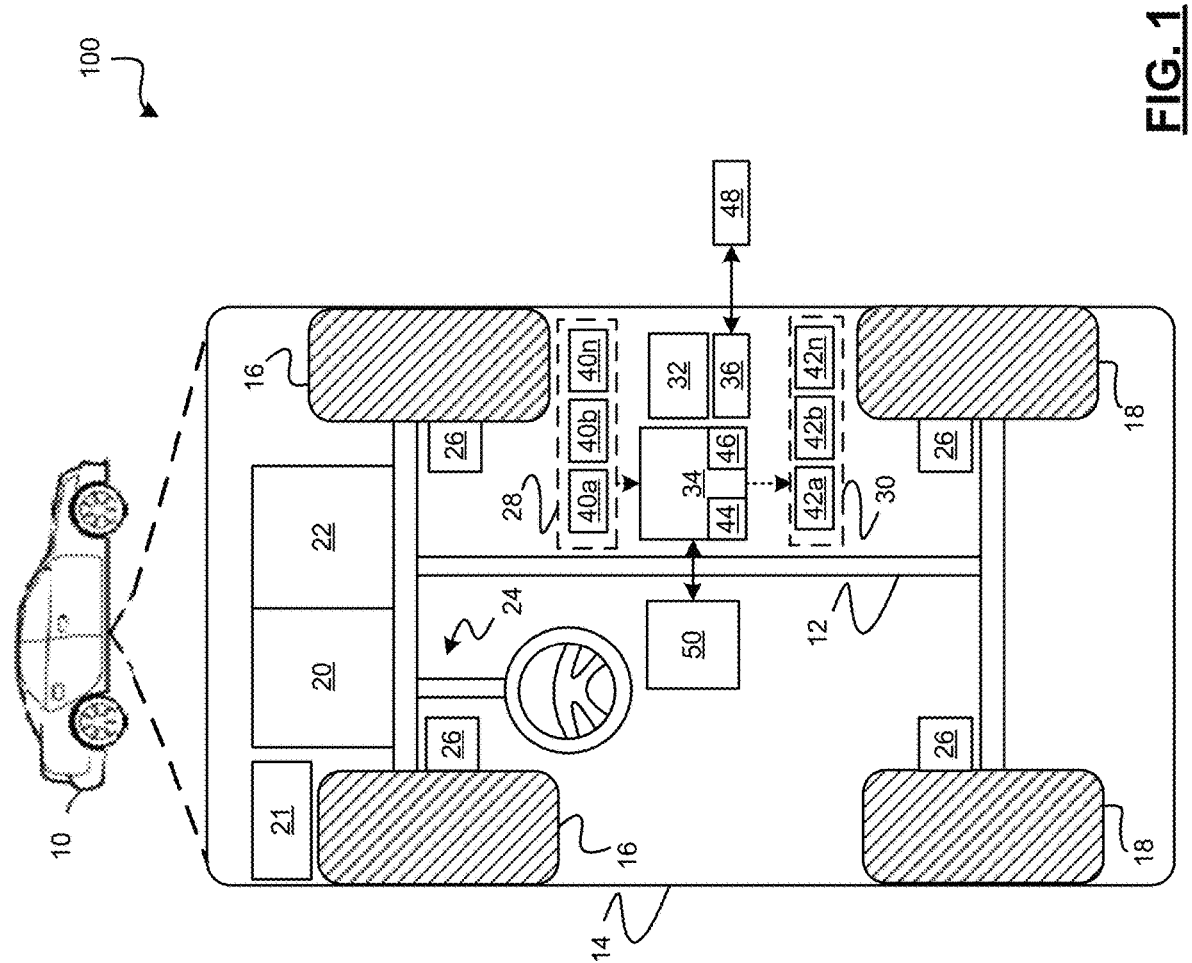
FIG. 1 is a schematic illustration of a vehicle with a controller implementing functions for generating a virtual view in accordance with various embodiments.

With reference to FIG. 1, a vehicle 10 is shown having a surround view display system 100 in accordance with various embodiments. Generally, the surround view display system 100 displays image data on a display 50 of the vehicle 10 to illustrate a surrounding view of the exterior environment of the vehicle 10 from a defined viewpoint, such as, but not limited to a birds-eye-viewpoint. As will be discussed in more detail below, the surround view display system 100 generates the display data based on camera to ground alignment methods and systems.

As shown in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle. The autonomous vehicle is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle is an automation system of Level Two or higher. A Level Two automation system indicates "partial automation." However, in other embodiments, the autonomous vehicle may be a so-called Level Three, Level Four or Level Five automation system. A Level Three automation system indicates conditional automation. A Level Four system indicates "high automation," referring to the driving mode-specific performance by an automated driving system of all aspects of the dynamic driving task, even when a human driver does not respond appropriately to a request to intervene. A Level Five system indicates "full automation", referring to the full-time performance by an automated driving system of all aspects of the dynamic driving task under all roadway and environmental conditions that can be managed by a human driver.

However, it is to be understood that the vehicle 10 may also be a conventional vehicle without any autonomous driving functions. The vehicle 10 may implement the functions and methods for generating a virtual view having harmonized color in accordance with the present disclosure.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, a fuel cell propulsion system, and/or a combination thereof. The transmission system 22 is configured to transmit power from the propulsion system 20 to the vehicle wheels 16 an 18 according to selectable speed ratios. According to various embodiments, the transmission system 22 may include a step-ratio automatic transmission, a continuously-variable transmission, a manual transmission, or any other appropriate transmission.

The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems (GPS), optical cameras, thermal cameras, ultrasonic sensors, and/or other sensors. The sensing devices 40a-40n are further configures to sense observable conditions of the vehicle 10. The sensing devices 40a-40n can include, but are not limited to, speed sensors, position sensors, inertial measurement sensors, temperature sensors, pressure sensors, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
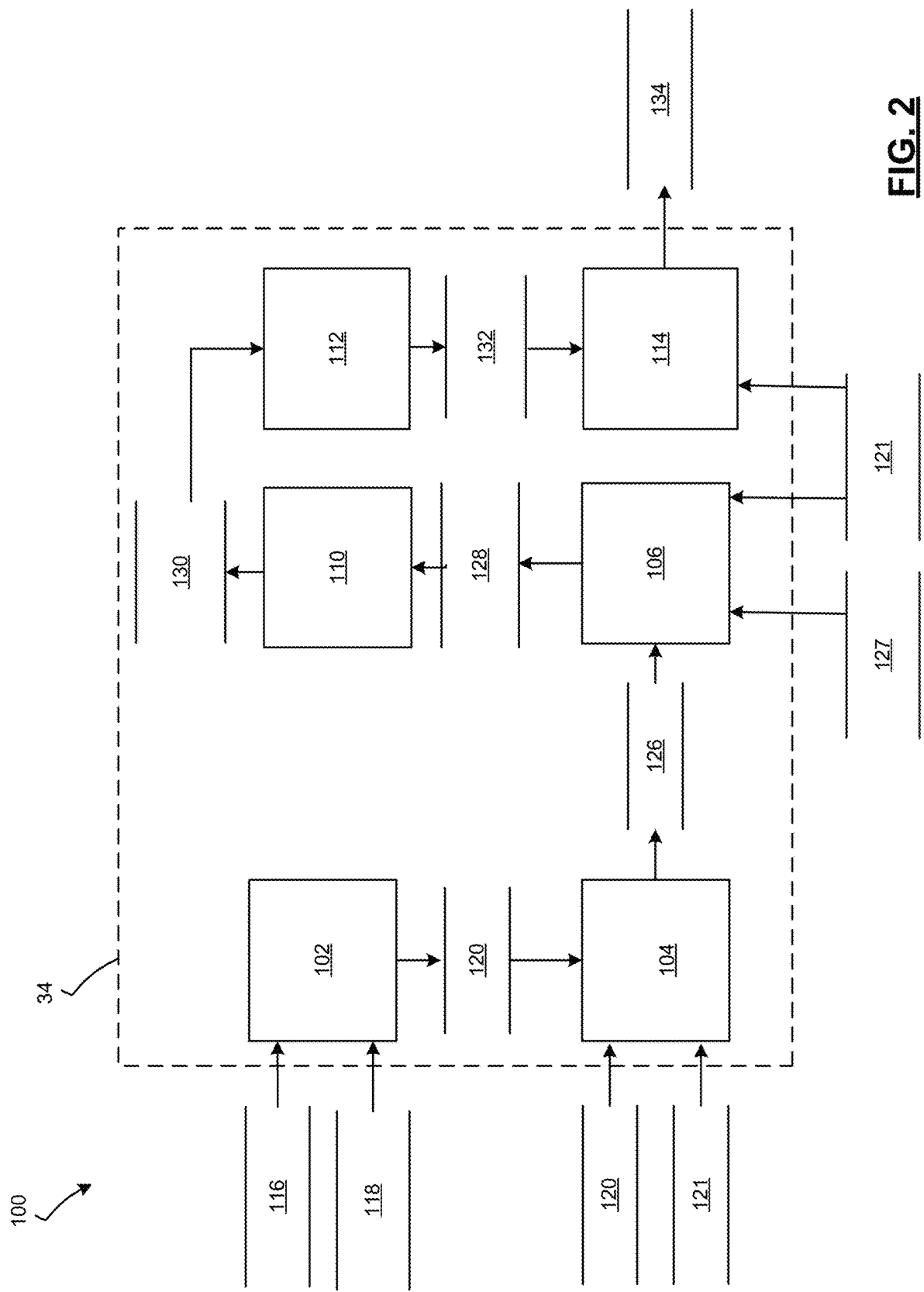
FIG. 2 is dataflow diagram illustrating the controller of the vehicle in accordance with various embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling functions of the vehicle 10. In various embodiments, the data storage device 32 stores defined maps of the navigable environment. The defined maps may include a variety of data other than road data associated therewith, including elevation, climate, lighting, etc. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling and executing functions of the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the surround view display system 100 and, when executed by the processor 44, process image data from at least one optical camera of the sensor system 28 to extract features from the images in order to determine the ground plane. The instructions, when executed by the processor 44, use the ground plane to determine camera alignment information. The camera alignment information is then used to assemble the image data to form a surround view from a defined perspective. In various embodiments, the sensing devices 40a to 40n include N (one or more) cameras that sense an external environment of the vehicle 10 and generate the image data (e.g., optical cameras that are configured to capture color pictures of the environment). The cameras are disposed so that they each cover a certain field of view of the vehicle's surroundings. The image data from each camera is assembled into a surround view based on, for example, the pose and the location of the camera relative to the vehicle and relative to the ground.

It will be appreciated that the controller 34 may otherwise differ from the embodiments depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

With reference to FIG. 2, and with continued reference to FIG. 1, a dataflow diagram illustrates elements of the surround view display system 100 of FIG. 1 in accordance with various embodiments. As can be appreciated, various embodiments of the surround view display system 100 according to the present disclosure may include any number of modules embedded within the controller 34 which may be combined and/or further partitioned to similarly implement systems and methods described herein. Furthermore, inputs to the surround view display system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as subsampling, noise-reduction, normalization, feature-extraction, missing data reduction, and the like. In various embodiments, the surround view display system 100 includes an enable module 102, region selection module 104, a feature prediction module 106, a ground detection module 110, a parameter determination module 112, and a display module 114.

In various embodiments, the enable module 102 receives as input vehicle data 116 and camera data 118. In various embodiments, the vehicle data 116 includes data indicating vehicle velocity, vehicle acceleration, and steering wheel angle. In various embodiments, the camera data 118 includes a determined distance between keyframes. The enable module 102 evaluates the inputs 116, 118 to determine whether the vehicle 10 is driving straight and smoothly. For example, the enable module 102 compares each input to a predefined threshold or multiple thresholds that define a range in order to determine if the condition is satisfied. If all conditions are not satisfied, it is determined that the vehicle 10 is not driving straight or is not driving smoothly, and enable data is set to indicate that the camera to ground alignment is not enabled. If all conditions are satisfied, it is determined that the vehicle 10 is driving straight and smoothly, and the enable data 120 is set to indicate that camera to ground alignment is enabled.

In various embodiment, the region selection module 104 receives as input the enable data 120, and image data 121, as well as lighting data 122. In various embodiments, the image data 121 includes data that defines a plurality of frames of images captured by the camera. In various embodiments, the lighting data 122 includes information about the environment from which the images where captured, such as the external lighting conditions, time of day, climate at that time, etc.

Figure 3A:
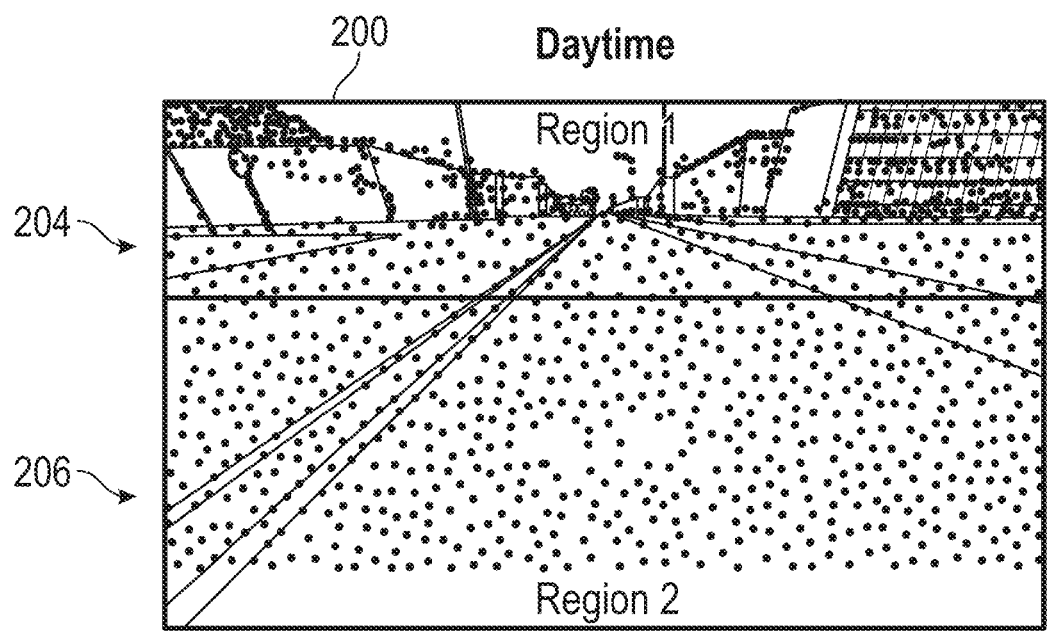
FIGS. 3A and 3B are illustrations of image data, feature points, and regions of interest in accordance with various embodiments.
Figure 3B:
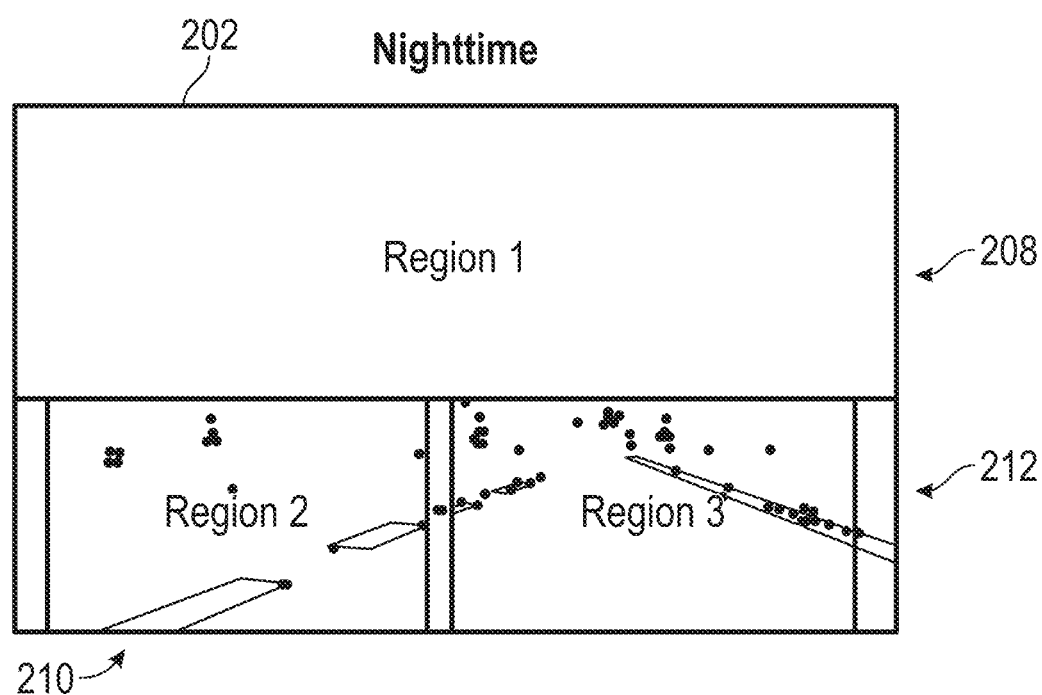

When the enable data 120 indicates that camara to ground alignment is enabled, the region selection module 104 identifies regions of interest (ROI) within each image frame of the image data 121. The ROIs are regions in which data is sufficient to predict features within the region. In various embodiments, the region selection module 104 identifies the ROIs based on the lighting data, the climate data, and/or the time data and generates ROI data 126 based thereon. For example, as shown in FIGS. 3A and 3B, each image frame 200, 202 can be divided into regions based on the time of day. FIG. 3A illustrates two regions associated with the image frame 200 captured at daytime, region 1 204 having a first lighting condition associated therewith, and region 2 206 having increased lighting condition associated therewith. FIG. 3B illustrates three regions associated with the image frame 202 captured at nighttime, region 1 208 having limited or no lighting, and region 2 210 and region 3 212 being identified by the exterior lighting conditions from taillights, roadside lights, etc. As can be appreciated, the regions of interest can be identified in each image frame based on any number of conditions and is not limited to the present lighting examples.

With reference back to FIG. 2, in various embodiments, the feature prediction module 106 receives as input the ROI data 126, and vehicle data 127. The feature prediction module 106 predicts feature points within the ROIs using the vehicle speed from the vehicle data 127. The feature prediction module 106 generates feature prediction data 128 that includes an indication of the feature points in the ROIs.

Figure 4:
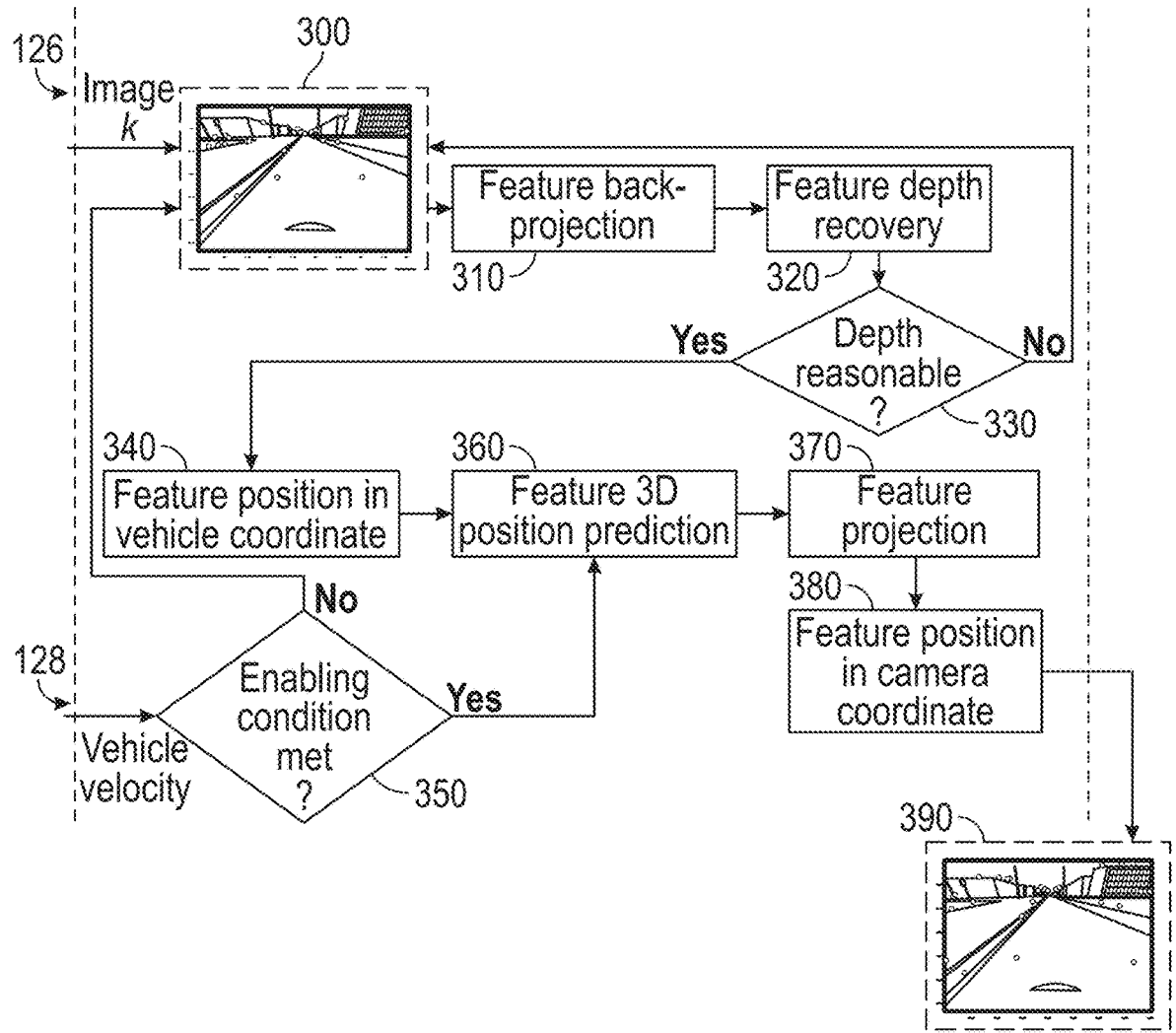
FIGS. 4, 5, 6, 7, and 8 are schematic illustrations of methods performed by the controller in accordance with various embodiments.

In various embodiments, the feature prediction module 106 predicts the feature points using a first method (referred to as the three dimensional (3D) projection method) that predicts a future position of the detected feature point in a next image k+1 based on three dimensional (3D) projection. For example, as shown in more detail in FIG. 4, the 3D projection method receives the extracted feature points from the ROIs in an image k as shown at 300, and for each feature point i, back-projects the identified feature point to a unit plane as:

$P_{k,i} = S_{k,i} K^{-1} p_{k,i}$ at 310, where K represents the matrix of the intrinsic parameters associated with the camera; and $S_{k,i}$ represents a scale value.

Thereafter, a depth d of the feature point is determined, assuming a flat plane, as:

$$d = \frac{h \|P_{k,i}\|}{\|P_{k,i} * n\|} \text{ at } 320,$$

where h represents the height of the center of the camera to the unit plane.

If the depth d is within a range at 330, feature shifting is determined based on a rotation from the camera $^V_C R$ and a determined vehicle velocity $v_k$ between frames as:

$Q_{k,i} = d *\ ^V_C R P_{k,i} - v_k * \Delta t$, at 340 and when the enabling conditions are met at 350. The 3D feature position is then predicted at 350.

The 3D feature is then projected back to the camera image at 360 to obtain the feature position in camera coordinates as:

$$P_{k+1,i} = S_{k,i} K^{*V}{}_C R^T {}^* Q_{k,i},\ \text{at } 370 \text{ ad } 380.$$

The predicted feature position of the image k+1 is shown at 390.

Figure 5:
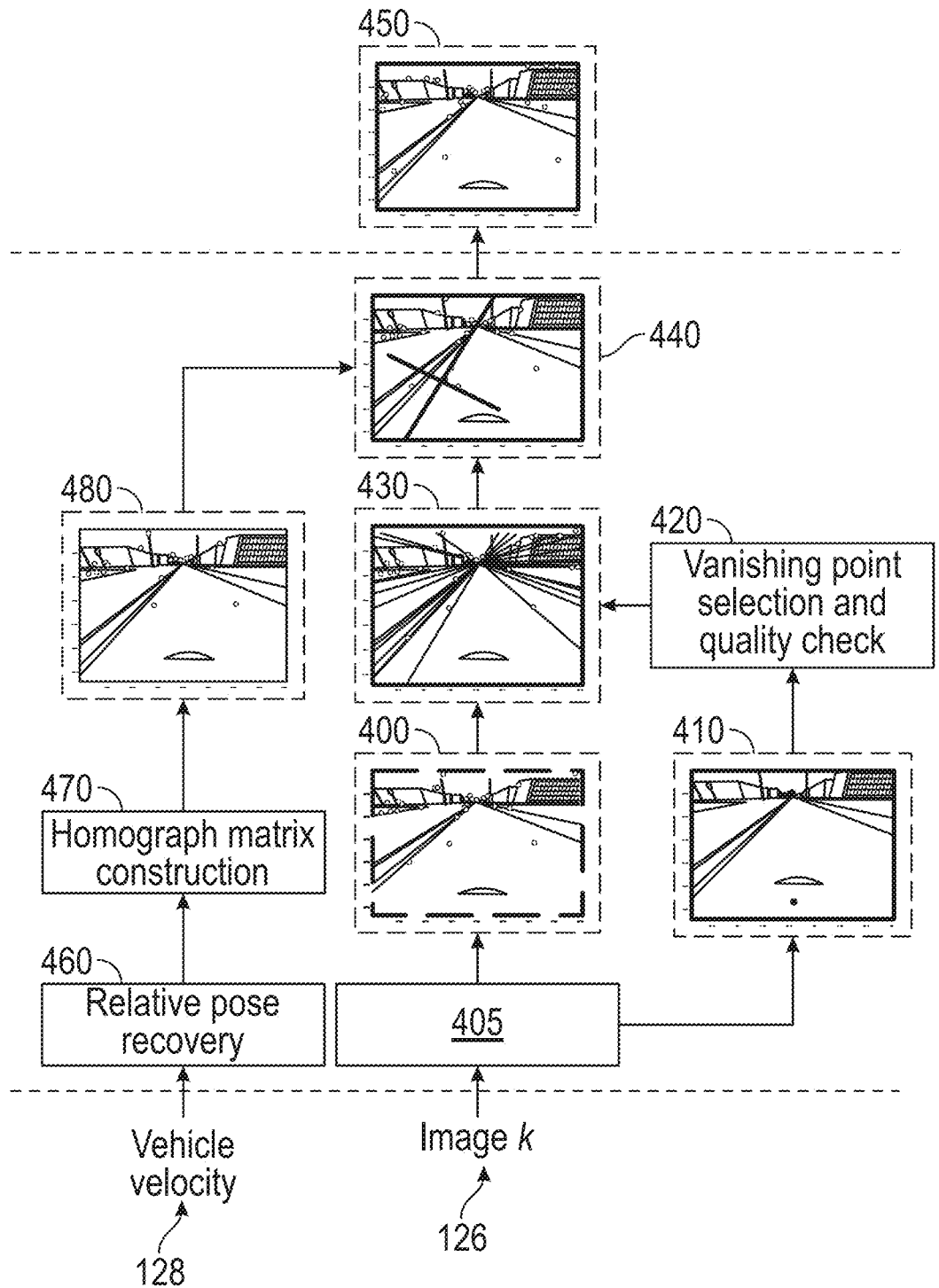

With reference back to FIG. 2, in various other embodiments, the feature prediction module 106 predicts the feature points using a second method (referred to as the vanishing point method) that predicts a future position of the detected feature point in a next image k+1 based on the vehicle velocity and a vanishing point in the images. For example, as shown in FIG. 5, the vanishing point method receives the extracted feature points from the ROIs in an image k as shown at 400 if enable conditions are met at 405.

The vanishing point method detects vanishing points in the image k that are associated with the detected feature points at 410. One of the vanishing points is selected and quality is checked at 420. Epipolar lines are determined based on the vanishing point and the feature points at 430. Feature projection is performed along the epipolar line based on a homography matrix 480 that is constructed at 460 and 470 to generate the predicted feature position of the image k+1 is shown at 450.

Figure 6:
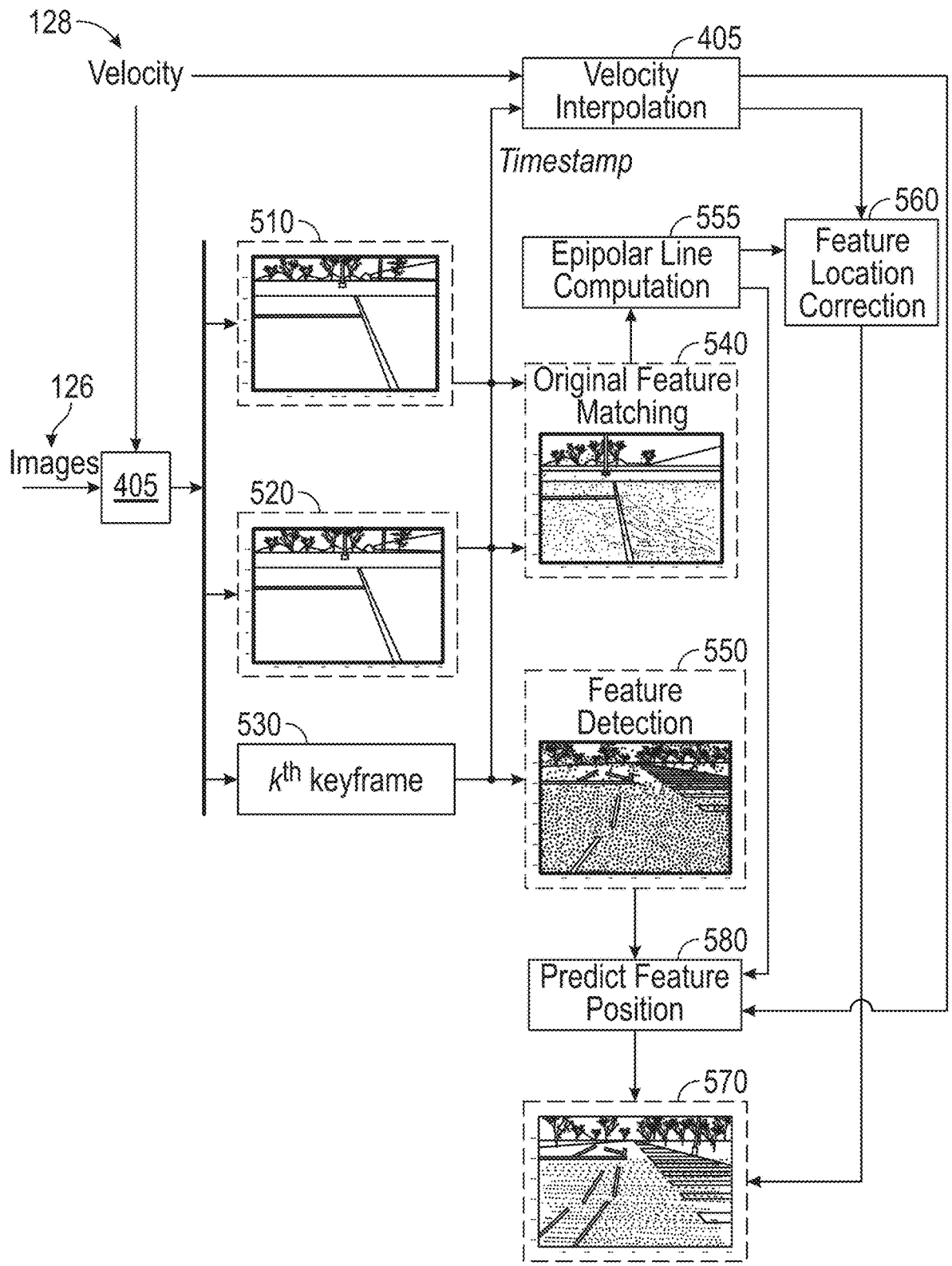

With reference back to FIG. 2, in various other embodiments, the feature prediction module 106 predicts the feature points using a third method (referred to as the epipolar method) that predicts a future position of the detected feature point in a next image k+1 based on an epipolar line in the image. For example, as shown in FIG. 6, the epipolar method processes the image frames for k keyframes as well as the vehicle velocity. The first keyframe is determined at 510, the second keyframe is determined at 520, and so on until the kth keyframe is determined at 530.

Thereafter, feature points are matched between two keyframes using two dimensional (2D) matching techniques at 540 and feature detection performed at 550. Epipolar lines are determined from the 2D feature points at 555. The predicted feature positions of the feature points in the image k+1 is shown at 570. The predicted feature positions are predicted using the epipolar lines and the vehicle velocity at 580. Any location corrections can be performed using the epipolar lines at 560.

With reference back to FIG. 2, the ground detection module 110 receives as input the feature prediction data 128. The ground detection module 110 selects ground features from the feature prediction data 128 and then identifies a ground plane from the selected features. The ground detection module 110 generates ground data 130 indicating the ground plane.

In various embodiments, the ground detection module 110 selects the ground features using a fixed two dimensional image road mask and a three dimensional region of interest box. In various other embodiments, the ground detection module 110 selects the ground features by estimating a road mask using semantic segmentation and machine learning techniques.

Figure 7:
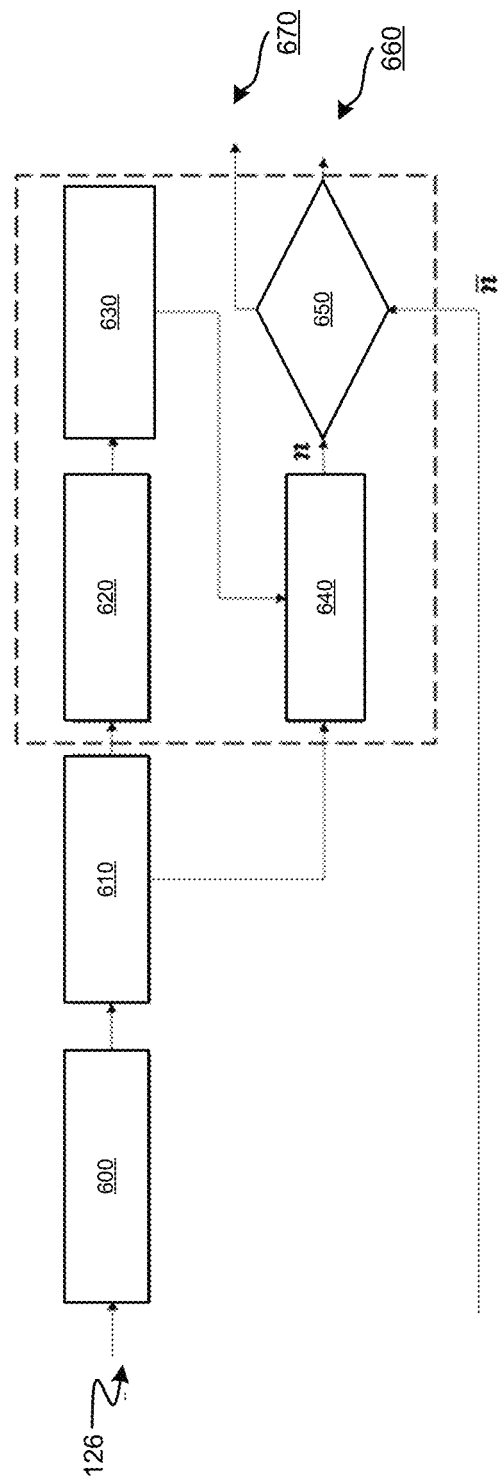

In various other embodiments, the ground detection module 110 selects the ground features using geometry constraints to remove any non-ground points. For example, as shown in FIG. 7, images are received, and feature extraction and feature detection and matching is performed at 600 and 610.

Thereafter, the relative pose between a first image frame and a second image frame is recovered at 620. The homography matrix H is computed at 630 as:

$$H = K\left(R_{k-1,k} - \frac{t_{k-1,k} * n}{h}\right) K^{-1}.$$

The ground normal vector is computed therefrom for a feature point at 640 using the relative pose R and non-colinear points q on the camera unit plane and the as:

$$((q_{k-1,i} \times q_{k-1,j}) \times R_{k-1,k}{}^T (q_{k,i} \times_{k,j}))^T n = 0.$$

When the difference between the ground normal vector n and a reference vector $\bar{n}$ is small (e.g., less than a threshold $\in$) at 650, than a ground feature is selected at 660. When the difference between the ground normal vector and the reference vector $\bar{n}$ is not small (e.g., greater than the threshold $\in$) at 650, than a ground feature is not selected at 670.

With reference back to FIG. 2, in various embodiments, the ground detection module 110 performs the ground feature selection as discussed above when the camera pose estimation is determined to be reliable. For example, the ground detection module 110 determines that the camera pose estimation is reliable when the camera rotation change is small when the vehicle is driving straight, and when the camera moving direction has a small angle with the vehicle motion vector.

Once the ground features are extracted, the ground detection module 110 then performs ground plane fitting of the selected ground points using a Random Sample Consensus (RANSAC) method such as, but not limited to, a M-estimator Sample Consensus (MSAC) method or some other method and by addressing constraints to ensure that the ground normal vector has a small angle with reference to the ground vector and is vertical to the vehicle motion vector.

The parameter determination module 112 receives as input the ground feature data 130. The parameter determination module 112 refines a ground normal vector from the identified ground plane and uses the refined ground normal vector for estimating alignment data 132 including the roll, pitch, yaw, and height of the camera.

Figure 8:
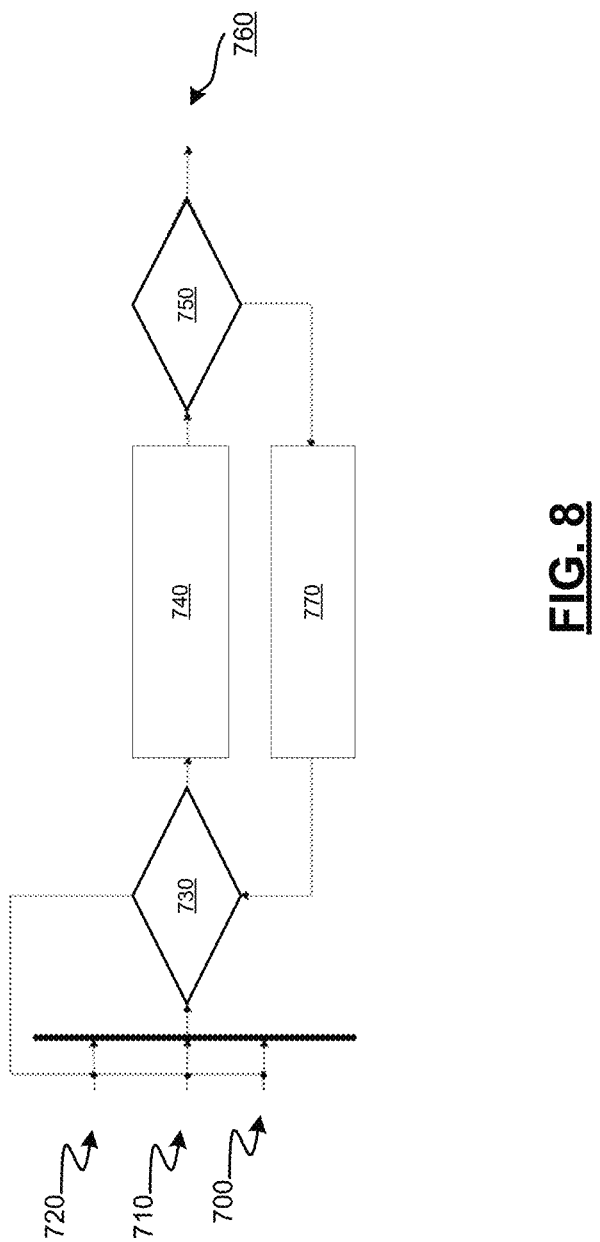

For example, as shown in FIG. 8, given camera intrinsic data 700, the keyframe ground feature at time k 710, and the camera pose at time k 720, a sliding window with size a is established.

When the sliding window is full at 730, the ground normal vector and camera ground height are refined at 740. For example, an optimized normal vector $\hat{n}$ and height $\hat{h}$ are obtained from the data in the sliding window by minimizing the transfer distance through homography:

$$f(n, h) = \frac{1}{2} \Sigma_{k=i}^{a} \Sigma_{i=1}^{b} \| p_{k,i} - H p_{k-1,i} \|^2$$

and updating:

$$T_{k+1} = T_k - ((J^T J + \lambda \text{diag}(J^T J))^{-1} J^T) f(n, h),\ \text{and}$$

$$T_k = f(n, h)\ \text{and}\ J = df/dT_k.$$

Where a represents the sliding window size; b represents the number of features between neighboring keyframes; H represents the homography matrix; and λ represents a damping factor. Once the optimized alignment data 760 is obtained from the window at 750, old feature data and camera poses are removed from the sliding window at 770 and the method returns to updating the window at 730. The optimized alignment data 760 is then used to determine the yaw, pitch, and roll of the camera.

With reference back to FIG. 2, the display module 114 receives as input the alignment data 132 and the image data 121. The display module 114 assembles the image data 121 into a surround view from a defined perspective based on the alignment data 123. The display generates display data 134 to display the surround view on the display 50 of the vehicle 10.

Figure 9:
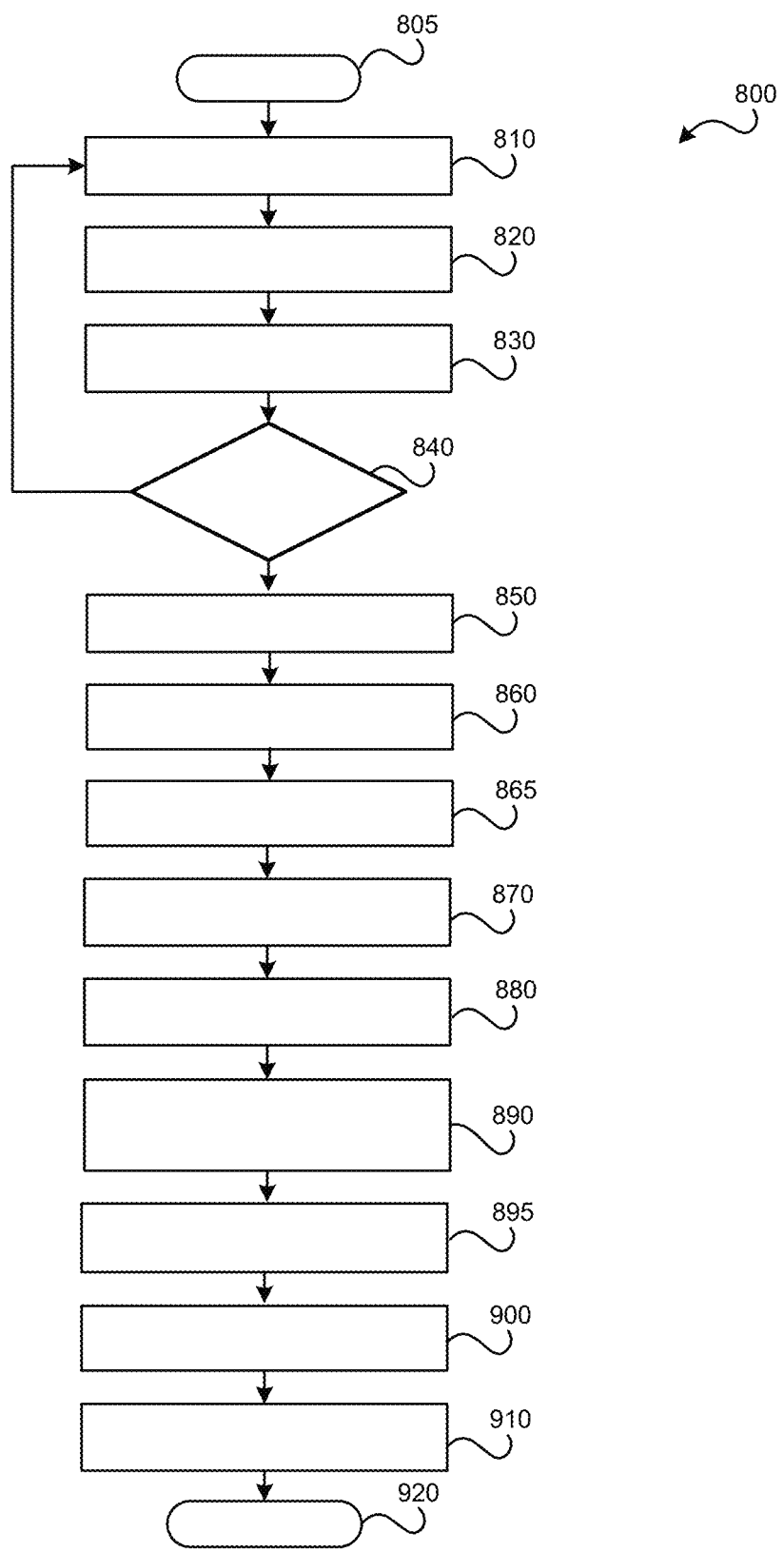
FIG. 9 is a flowchart illustrating methods performed by the vehicle and the controller in accordance with various embodiments.

With reference to FIG. 9 and with continued reference to FIGS. 1-8, a flowchart is provided of a method 800 for displaying surround view image data within the vehicle 10 of FIG. 1 using the surround view display system 100 that implements the camera to ground alignment methods and systems of FIGS. 1 and 2. As can be appreciated in light of the disclosure, the order of operation within the method 800 is not limited to the sequential execution as illustrated in FIG. 9, but may be performed in one or more varying orders as applicable and in accordance with the present disclosure. In various embodiments, the method 800 can be scheduled to run based on one or more predetermined events, and/or can run continuously during operation of the vehicle 10.

In one example, the method 800 may begin at 805. Input data is obtained at 810-830. For example, image data depicting k frames of images captured by one camera of the vehicle 10 is obtained at 810. Velocity data and other vehicle data is obtained at 820. Lighting data associated with the vehicle environment is obtained at 830.

Thereafter, enabling conditions are evaluated to ensure the vehicle 10 is driving straight and smoothly. For example, parameters, including, but are not limited to, velocity, acceleration, steering wheel angle, and distance between keyframes are compared with thresholds and/or ranges at 840. If one or more of the enabling conditions is not satisfied at 840, the method 800 continues with obtaining new input data at 810-830.

Once the enable conditions are satisfied at 840, the camera to ground alignment is performed at 850-900 and display data is generated based on the camera to ground alignment at 910. For example, the lighting data and image data are evaluated to determine ROIs at 850. Feature prediction is performed on the ROIs based on, for example, the 3D projection method, the vanishing point method, or the epipolar line method as discussed above at 860. Thereafter, feature data associated with image frames having an associated camera pose that is deemed reliable are used and feature data with unreliable camera pose are filtered out at 865.

Using the filtered feature data, ground features are selected from the feature points at 870 based on, for example, a fixed 2D mask and a 3D ROI box, a dynamic 2D mask, or homography constraints as discussed above. A ground plane is determined from the selected feature points at 880. A normal vector and a camera height is computed from the ground plane at 890 and are refined using, for example, the sliding window method as discussed above, and the constraints discussed above at 895.

Thereafter, the camera parameters including pitch, yaw, and roll are determined at 900. Display data is then generated at 910 based on the camera parameters to display the image data on the display 50 of the vehicle 10, for example, according to a different perspective. Thereafter, the method 800 may end at 920.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for a vehicle, the method comprising:
    receiving image data defining a plurality of images associated with an environment of the vehicle;
    receiving vehicle data indicating a velocity of the vehicle, wherein the vehicle data is associated with the image data;
    determining, by a processor, feature points within at least one image based on the vehicle data and a three dimensional projection method;
    selecting, by the processor, a subset of the feature points as ground points;
    determining, by the processor, a ground plane based on the subset of feature points;
    determining, by the processor, a ground normal vector from the ground plane;
    determining, by the processor, a camera to ground alignment value based on the ground normal vector; and
    generating, by the processor, second image data based on the camera to ground alignment value.

2. The method of claim 1, wherein the three dimensional projection method determines a feature point from a two dimensional image sequence from the plurality of images using back-projection of the feature point from a two dimensional image to a unit plane.

3. The method of claim 2, wherein the three dimensional projection method further determines the feature point from the two dimensional image sequence by determining feature shifting in the unit plane based on the vehicle data, and predicting a three dimensional point of the feature point based on the feature shifting.

4. The method of claim 3, wherein the three dimensional projection method further determines the feature point by projecting the three dimensional point of the feature point back to the two dimensional image based on the feature shifting.

5. The method of claim 1, wherein the selecting the subset of feature points is based on a fixed two dimensional image road mask and a three dimensional region.

6. The method of claim 1, wherein the selecting the subset of feature points is based on a dynamic two dimensional image road mask.

7. The method of claim 1, wherein the selecting the subset of feature points is based on homography constraints.

8. The method of claim 1, further comprising:
    receiving lighting data indicating lighting conditions associated with the environment of the vehicle;
    selecting at least one region of interest within the at least one image based on the lighting data; and
    wherein the determining the feature points is based on the at least one region of interest.

9. The method of claim 7, wherein the lighting data includes at least one of environmental lighting data, climate data, and time of day data.

10. The method of claim 1, further comprising:
    evaluating vehicle conditions to determine when the vehicle driving is smooth and straight; and wherein in response to the determination that the vehicle is driving smooth and straight, the determining the feature points is performed.

11. The method of claim 10, wherein the vehicle conditions include vehicle acceleration, vehicle velocity, and steering wheel angle.

12. The method of claim 10, wherein the vehicle conditions include a determined distance travelled between two images of the plurality of images.

13. The method of claim 1, further comprising:
refining the ground normal vector based on a sliding window method associated with the plurality of images.

14. The method of claim 1, wherein the refining the ground normal vector is further based on a minimization of a computed transfer distance based on homography.

15. The method of claim 1, wherein the determining the ground plane is based on constraints associated with a reference ground normal vector and a motion direction.

16. A computer implemented system for a vehicle, the system comprising:
a data storage element comprising computer readable instructions; and
a processor configured to execute the computer readable instructions, the computer readable instructions controlling the processor to perform operations comprising:
receiving image data defining a plurality of images associated with an environment of the vehicle;
receiving vehicle data indicating a velocity of the vehicle, wherein the vehicle data is associated with the image data;
determining feature points within at least one image based on the vehicle data and a three-dimensional projection method;
selecting a subset of the feature points as ground points;
determining a ground plane based on the subset of feature points;
determining a ground normal vector from the ground plane;
determining a camera to ground alignment value based on the ground normal vector; and
generating second image data based on the camera to ground alignment value.

17. The system of claim 16, wherein the three dimensional projection method determines a feature point from a two dimensional image sequence from the plurality of images using back-projection of the feature point from a two dimensional image to a unit plane.

18. The system of claim 17, wherein the three dimensional projection method further determines the feature point from the two dimensional image sequence by determining feature shifting in the unit plane based on the vehicle data, predicting a three dimensional point of the feature point based on the feature shifting, and projecting the three dimensional feature point of the feature point back to the two dimensional image based on the feature shifting.

19. A vehicle, comprising:
a camera configured to capture images of an environment of the vehicle; and
a controller having a processor configured to receive the images, receive vehicle data indicating a velocity of the vehicle, wherein the vehicle data is associated with the images, determine feature points within at least one image based on the vehicle data and a three-dimensional projection method, select a subset of the feature points as ground points, determine a ground plane based on the subset of feature points, determine a ground normal vector from the ground plane, determine a camera to ground alignment value based on the ground normal vector.

20. The vehicle of claim 19, wherein the processor is configured select the subset of feature points based on a fixed two dimensional image road mask and a three dimensional region.

* * * * *